US011266932B2

(12) United States Patent
Benson et al.

(10) Patent No.: US 11,266,932 B2
(45) Date of Patent: Mar. 8, 2022

(54) FAUCET FILTRATION SYSTEM AND RELATED METHODS

(71) Applicant: AQUAMEDIX LLC, Minneapolis, MN (US)

(72) Inventors: J. Brady Benson, Minneapolis, MN (US); D J Emmons, Isle, MN (US)

(73) Assignee: AQUAMEDIX LLC., Minneapolis, MN (US)

( * ) Notice: Subject to any disclaimer, the term of this patent is extended or adjusted under 35 U.S.C. 154(b) by 547 days.

(21) Appl. No.: 15/875,925

(22) Filed: Jan. 19, 2018

(65) Prior Publication Data

US 2018/0207563 A1    Jul. 26, 2018

Related U.S. Application Data

(60) Provisional application No. 62/448,824, filed on Jan. 20, 2017.

(51) Int. Cl.
| | | |
|---|---|---|
| *B01D 35/30* | (2006.01) | |
| *B01D 35/157* | (2006.01) | |
| *C02F 1/00* | (2006.01) | |
| *B01D 29/33* | (2006.01) | |
| *B01D 29/21* | (2006.01) | |
| *B01D 35/04* | (2006.01) | |
| *B01D 29/58* | (2006.01) | |

(Continued)

(52) U.S. Cl.
CPC .......... *B01D 35/306* (2013.01); *B01D 29/21* (2013.01); *B01D 29/33* (2013.01); *B01D 29/58* (2013.01); *B01D 35/04* (2013.01); *B01D 35/1573* (2013.01); *C02F 1/003* (2013.01); *B01D 2201/162* (2013.01); *B01D 2201/302* (2013.01); *B01D 2201/304* (2013.01); *B01D 2201/305* (2013.01); *B01D 2201/34* (2013.01); *C02F 1/283* (2013.01); *C02F 1/44* (2013.01); *C02F 2201/004* (2013.01); *C02F 2201/005* (2013.01); *C02F 2201/006* (2013.01); *C02F 2307/06* (2013.01)

(58) Field of Classification Search
None
See application file for complete search history.

(56) References Cited

U.S. PATENT DOCUMENTS

| D277,305 S | 1/1985 | Grube |
|---|---|---|
| 4,504,389 A | 3/1985 | Rundzaitis |

(Continued)

*Primary Examiner* — Jonathan M Peo
(74) *Attorney, Agent, or Firm* — Viksnins Harris Padys Malen LLP

(57) ABSTRACT

A water filtration apparatus comprises a housing having a housing outlet and a housing inlet, the housing outlet configured to allow filtered water to exit therefrom, the housing inlet includes a valve stem, where the housing has latch arms disposed adjacent to the valve stem. At least one filter is disposed in the interior portion of the housing, and the at least one filter is in fluid communication with the housing outlet and the housing inlet. A valve assembly includes a valve body releasably coupled with the valve stem, where the valve body has a faucet interface component, and the valve body configured to fluidly couple with a faucet via the faucet interface component. The valve assembly has a valve body release coupled with the valve body, and the valve body release is slidable relative to the valve body and the one or more latch arms.

1 Claim, 16 Drawing Sheets

(51) Int. Cl.
  *C02F 1/28*   (2006.01)
  *C02F 1/44*   (2006.01)

(56) References Cited

U.S. PATENT DOCUMENTS

| | | | |
|---|---|---|---|
| 4,770,768 A * | 9/1988 | Lang | B01D 35/043 |
| | | | 210/94 |
| 5,017,286 A * | 5/1991 | Heiligman | B01D 35/043 |
| | | | 210/266 |
| D358,868 S | 5/1995 | Hembree et al. | |
| D398,369 S | 9/1998 | Hayes et al. | |
| D398,703 S | 9/1998 | Hayes et al. | |
| D410,728 S | 6/1999 | Kurth et al. | |
| 5,935,426 A | 8/1999 | Giordano et al. | |
| 6,123,837 A | 9/2000 | Wadsworth et al. | |
| D457,596 S | 5/2002 | Guzman et al. | |
| D484,567 S | 12/2003 | Gaston et al. | |
| 6,797,156 B2 * | 9/2004 | Chau | B01D 35/04 |
| | | | 137/549 |
| D533,622 S | 12/2006 | Ross et al. | |
| D542,374 S | 5/2007 | Green et al. | |
| 7,810,650 B2 | 10/2010 | Ennis et al. | |
| D635,640 S | 4/2011 | Xu | |
| 9,004,290 B2 | 4/2015 | Tanner et al. | |
| D794,747 S | 8/2017 | Kimura et al. | |
| D794,748 S | 8/2017 | Kimura et al. | |
| D823,433 S | 7/2018 | Benson | |
| 2006/0175270 A1 * | 8/2006 | Greene | B01D 29/66 |
| | | | 210/798 |

* cited by examiner

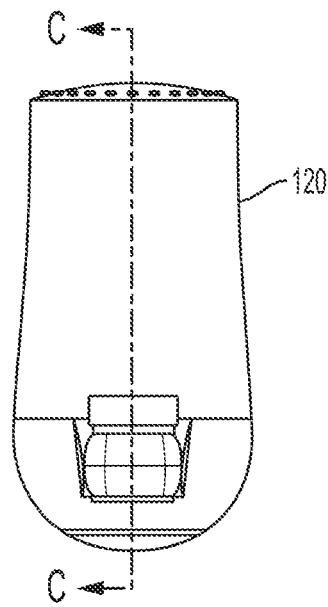
FIG. 4A
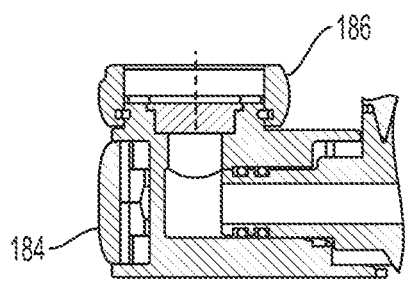
FIG. 4B
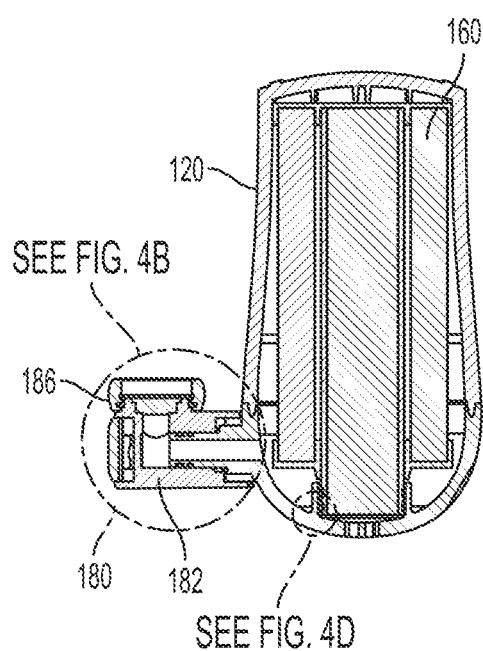
FIG. 4C
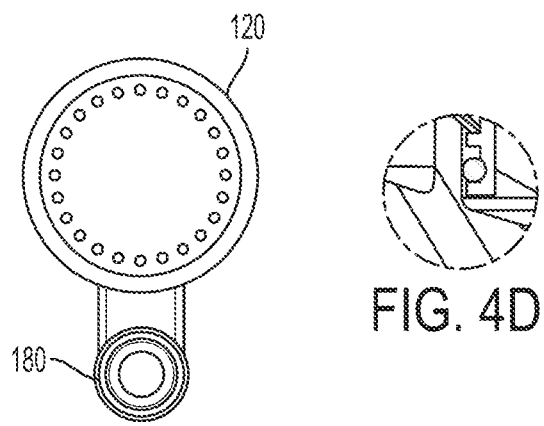
FIG. 4E
FIG. 4D

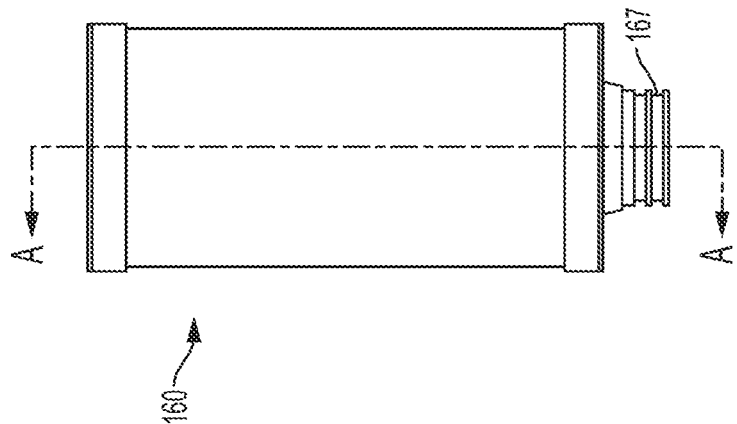
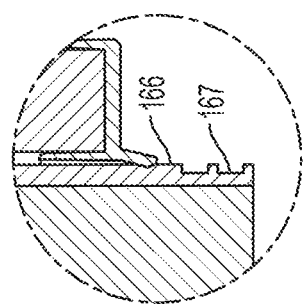
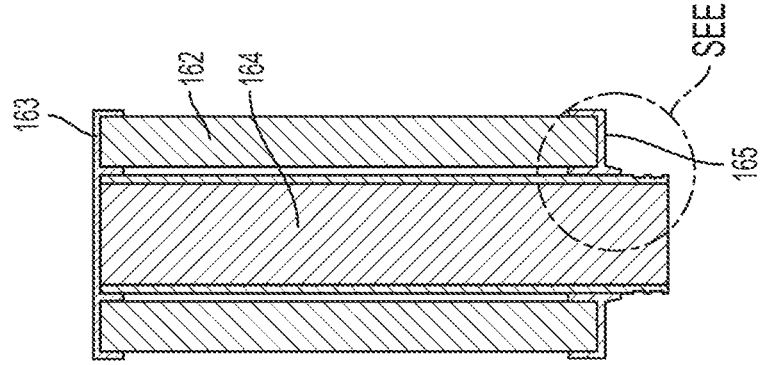
FIG. 11C
FIG. 11B
FIG. 11A

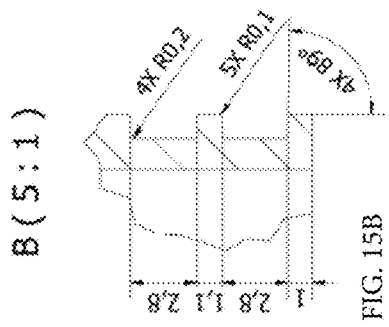
FIG. 15B
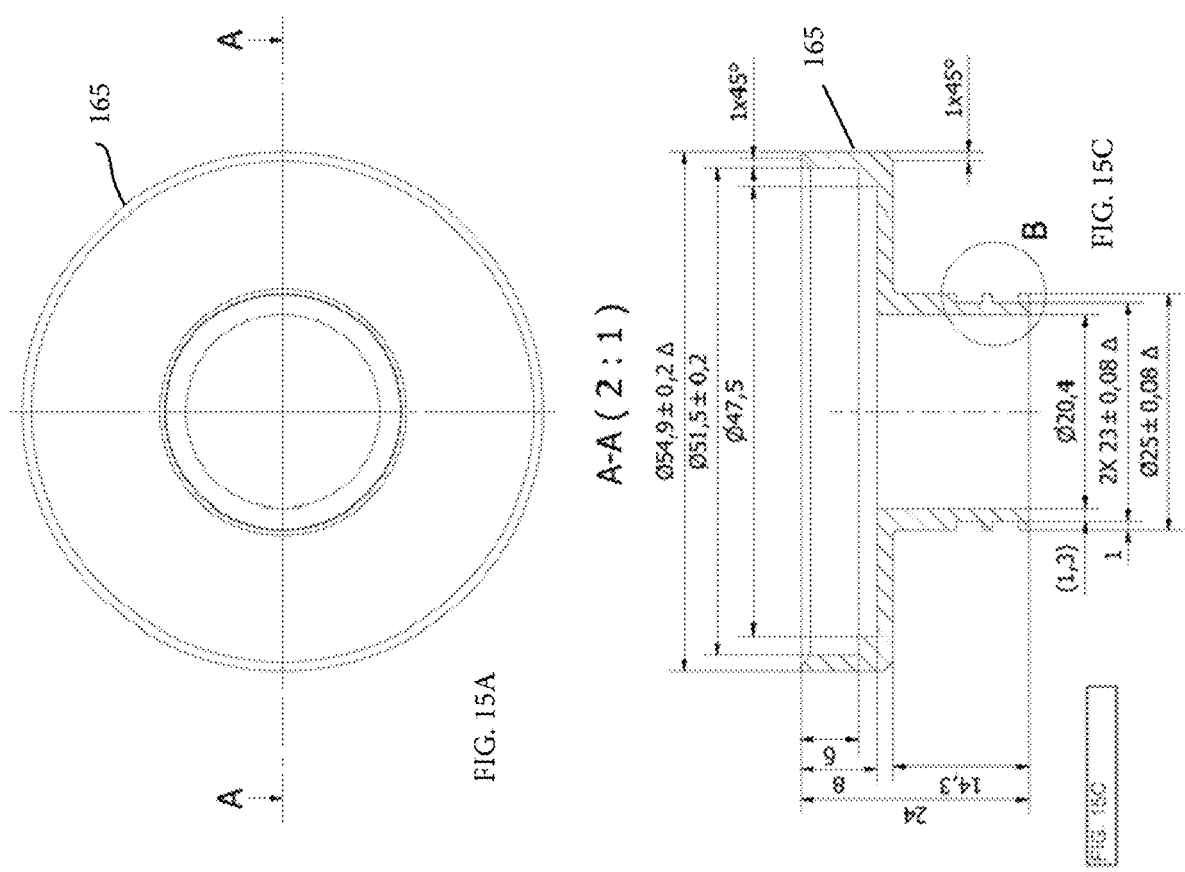
FIG. 15A
FIG. 15C

FAUCET FILTRATION SYSTEM AND RELATED METHODS

CROSS REFERENCE TO RELATED APPLICATIONS

This application claims priority to U.S. Provisional Application No. 62/448,824 that was filed on Jan. 20, 2017. The entire content of the applications referenced above are hereby incorporated by reference herein

TECHNICAL FIELD

A filtration system for faucets and/or showers and related methods.

TECHNICAL BACKGROUND

Bacteria are becoming stronger and more resistant to antibiotics as well as plumbing is becoming aged and contaminated with biofilms. As the population ages and with the rise of immune attacking viruses like aids grows, the population of people who are immune compromised grows. Given the growth in these risk factors, the number of Hospital Acquired Infections (HAI) cases due to water born bacteria is on the rise in hospitals, nursing homes, and assisted living centers. Specifically, in hospitals it is difficult to guarantee the hygiene of the potable water by treatment at the building point of entry. Hospital buildings often have water supply lines where water has low flow or can be stagnate and disinfectants can become consumed in trying to reduce the bio-films in plumbing. Bacteria such as *Legionella* and *Pseudomonas* are shed from the bio-film into the water inside pipes exposing patients and hospital staff are to bacteria known to cause HAIs. When bacteria in water travels through fixtures such as in shower heads and faucets the bacteria becomes aerosolized and breathed into the people's lungs causing severe and fatal infections like Legionnaires disease, especially in immune comprised individuals. This can also happen at assisted living centers, nursing homes, apartments, town homes, or single-family homes. People who are immune compromised such as the elderly, infants, and people with immune compromising diseases need to be especially careful of infection from either air born or water borne bacteria.

What is needed is a filtration device that can be efficiently and effectively installed to a point of use (POU) fixture, such as a faucet, shower head of other POU fixture.

SUMMARY

A water filtration apparatus comprises a housing having an interior portion and an exterior portion and extending from a top portion to a bottom portion, the housing having a housing outlet and a housing inlet each extending between the interior portion and the exterior portion, the housing outlet configured to allow filtered water to exit therefrom, the housing inlet includes a valve stem, where the housing has latch arms disposed adjacent to the valve stem.

At least one filter is disposed in the interior portion of the housing, and the at least one filter is in fluid communication with the housing outlet and the housing inlet. A valve assembly includes a valve body releasably coupled with the valve stem, where the valve body has a faucet interface component, and the valve body configured to fluidly couple with a faucet via the faucet interface component.

The valve assembly has a valve body releasably coupled with the valve body, and the valve body release is slidable relative to the valve body and the one or more latch arms. The housing latch arms are releasably coupled to the valve body and released by the valve body release (slider) when the slider is moved toward the housing and lifts the latch arms on the housing to release them from the valve body.

In one or more embodiments, the valve assembly is released from the valve stem in a second uncoupled position.

In one or more embodiments, the housing has two latch arms disposed on opposite sides of the valve stem.

In one or more embodiments, the latch arms each include a ramp and a latch.

In one or more embodiments, the latch arms include internal projections that couple with the latch.

In one or more embodiments, the displacement of the valve release towards the housing expands the latch arms and releases the projection from the latch.

In one or more embodiments, the housing includes an upper housing and a lower housing, and the valve stem is disposed on the lower housing.

In one or more embodiments, the filter includes a pre-filter and an internal filter, and the pre-filter surrounds the internal filter.

In one or more embodiments, the pre-filter comprises a 0.5-5.0—micron cartridge and the internal filter comprises a 0.05-0.25 micron cartridge. Most preferably the prefilter is 1.5-2.5 micron and the internal filter is 0.1-0.2 micron cartridge.

In one or more embodiments, the housing further includes blocking structure disposed within or adjacent to the housing outlet.

In one or more embodiments, a water filtration apparatus includes a housing having an interior portion and an exterior portion and extending from a top portion to a bottom portion, the housing having a housing outlet and a housing inlet each extending between the interior portion and the exterior portion, the housing outlet configured to allow filtered water to exit therefrom, the housing inlet includes a valve stem, where the housing has one or more latch arms disposed adjacent to the valve stem.

At least one filter assembly disposed in the interior portion of the housing, and at least one filter in fluid communication with the housing outlet and the housing inlet.

One, two or more seals are disposed between the at least one filter assembly and the housing.

The filtration apparatus further includes a valve assembly having a valve body releasably coupled with the valve stem, the valve body having a faucet interface component, the valve body configured to fluidly couple with a faucet, and the valve assembly has a valve body release coupled with the valve body.

In one or more embodiments, the filtration apparatus further includes three or more seals.

In one or more embodiments, the seals comprise O-rings fitted on the filtration assembly.

In one or more embodiments, the filtration assembly includes an upper cap and lower cap on a pre-filter, and an internal filter casing on an internal filter.

In one or more embodiments, the internal filter casing has one or more recesses, the recesses receive the seals therein.

In one or more embodiments, the valve stem has one or more recesses, the recesses receive the seals therein.

In one or more embodiments, a method for operating a filtration assembly, the filtration assembly comprises a housing having an interior portion and an exterior portion and extending from a top portion to a bottom portion, the housing having a housing outlet and a housing inlet each extending between the interior portion and the exterior portion, the housing outlet configured to allow filtered water to exit therefrom, the housing inlet includes a valve stem; the housing having latch arms disposed adjacent to the valve stem; at least one filter disposed in the interior portion of the housing, the at least one filter in fluid communication with the housing outlet and the housing inlet; a valve assembly having a valve body releasably coupled with the valve stem, the valve body having a faucet interface component, the valve body configured to fluidly couple with a faucet; the valve assembly having a valve body release coupled with the valve body, the valve body release slidable relative to the valve body and the one or more latch arms. The valve body assembly is releasably coupled with the filter housing assembly by the latch arms.

The method further includes displacing the valve release toward the housing, expanding the latch arms with the valve release and disengaging the arms from the valve body, and disconnecting the valve assembly from the valve stem and moving the valve assembly to a second uncoupled position.

In one or more embodiments, the method further includes coupling the valve assembly with a faucet.

These and other embodiments, aspects, advantages, and features of the present invention will be set forth in part in the description which follows, and will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims and their equivalents.

BRIEF DESCRIPTION OF THE FIGURES

FIG. 4A illustrates a side view of a water filtration apparatus in accordance with one or more embodiments.

FIG. 4B illustrates an enlarged cross-sectional view of a water filtration apparatus and valve body in accordance with one or more embodiments.

FIG. 4C illustrates a cross-sectional view of a water filtration apparatus in accordance with one or more embodiments.

FIG. 4D illustrates an enlarged cross-sectional view of a water filtration apparatus in accordance with one or more embodiments.

FIG. 4E illustrates a top view of a water filtration apparatus in accordance with one or more embodiments.

FIG. 11A illustrates a cross-sectional view of a filtration assembly in accordance with one or more embodiments.

FIG. 11B illustrates an enlarged cross-sectional view of a filtration assembly in accordance with one or more embodiments.

FIG. 11C illustrates a side view of a filtration assembly in accordance with one or more embodiments.

FIGS. 15A-15C illustrate a lower cap for the single filter member filtration apparatus.

DETAILED DESCRIPTION

The following detailed description includes references to the accompanying drawings, which form a part of the detailed description. The drawings show, by way of illustration, specific embodiments in which the apparatus may be practiced. These embodiments, which are also referred to herein as "examples" or "options," are described in enough detail to enable those skilled in the art to practice the present embodiments. The embodiments may be combined, other embodiments may be utilized or structural or logical changes may be made without departing from the scope of the invention. The following detailed description is, therefore, not to be taken in a limiting sense and the scope of the invention is defined by the appended claims and their legal equivalents.

In this document, the terms "a" or "an" are used to include one or more than one, and the term "or" is used to refer to a nonexclusive "or" unless otherwise indicated. In addition, it is to be understood that the phraseology or terminology employed herein, and not otherwise defined, is for the purpose of description only and not of limitation.

Figure 1A:
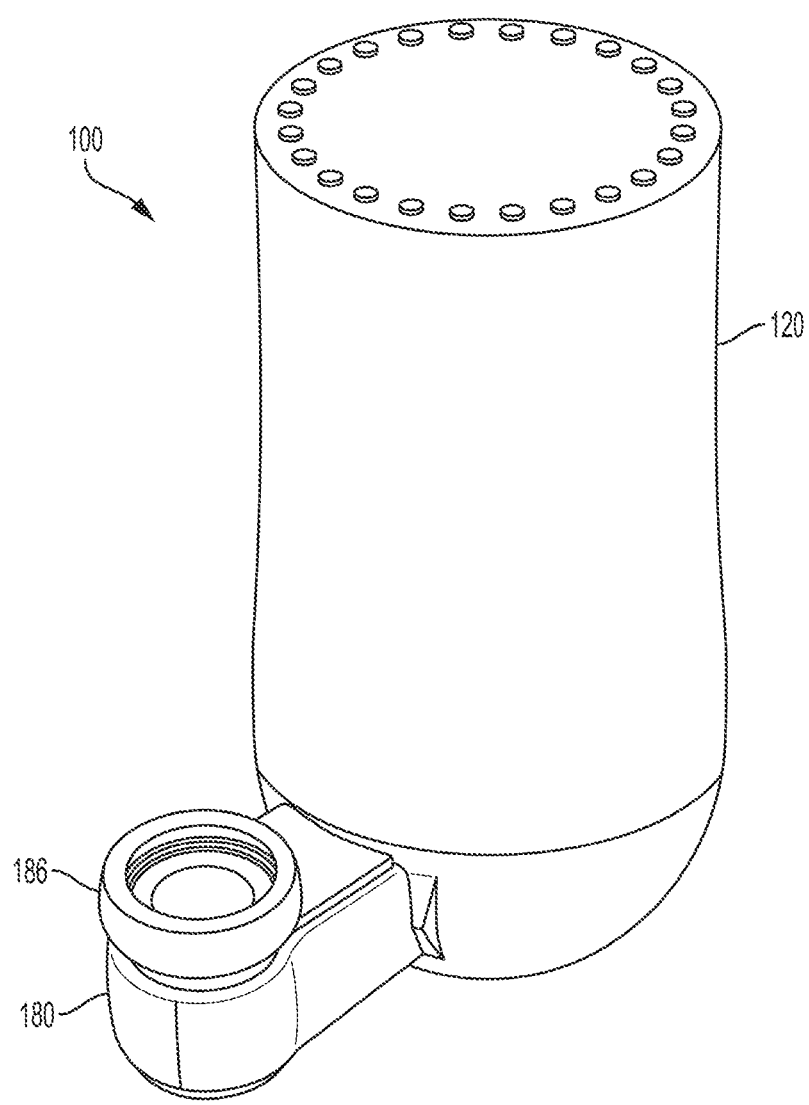
FIG. 1A illustrates a perspective view of a water filtration apparatus in accordance with one or more embodiments.
Figure 1B:
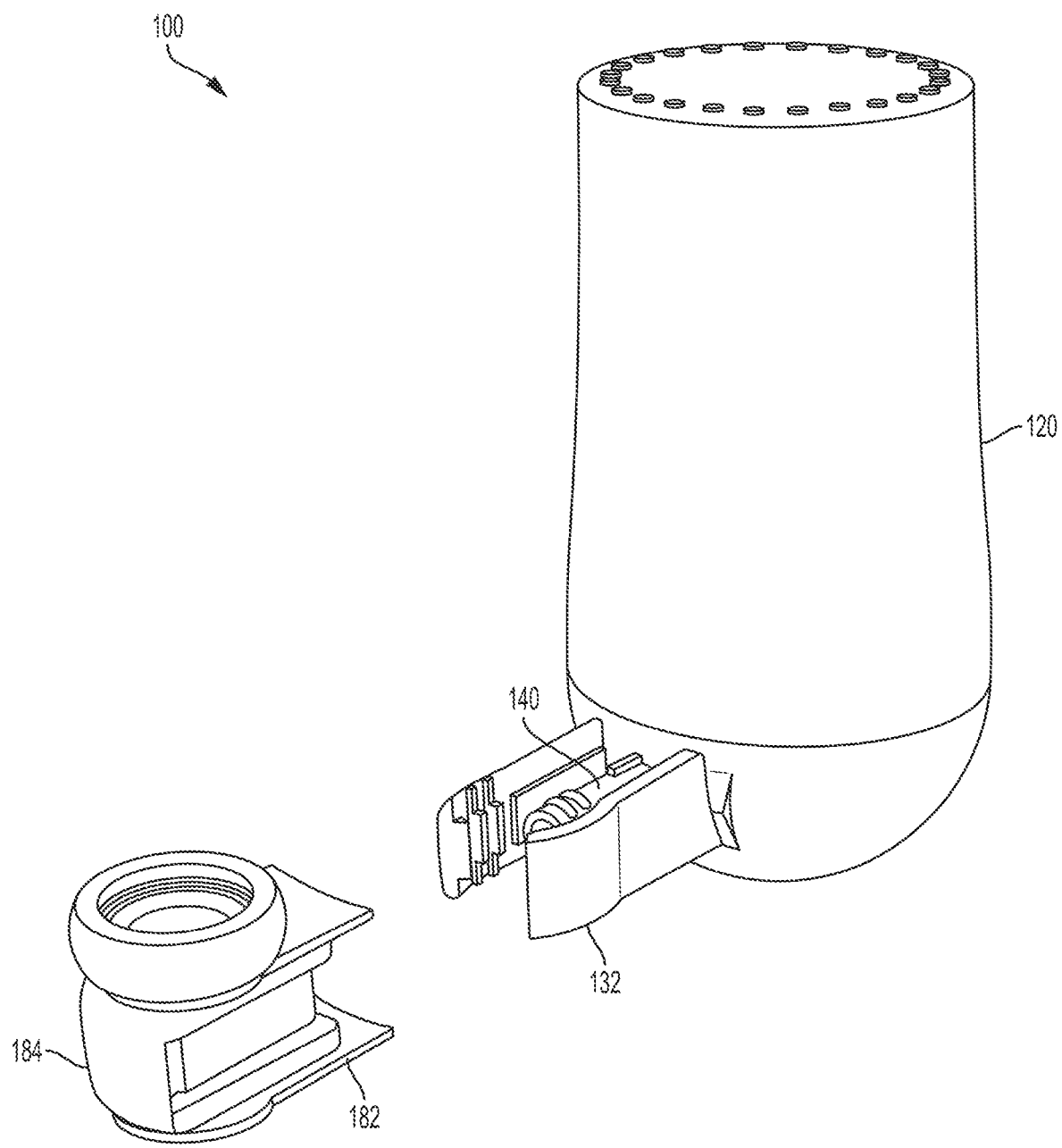
FIG. 1B illustrates an exploded perspective view of a water filtration apparatus in accordance with one or more embodiments.
Figure 1C:
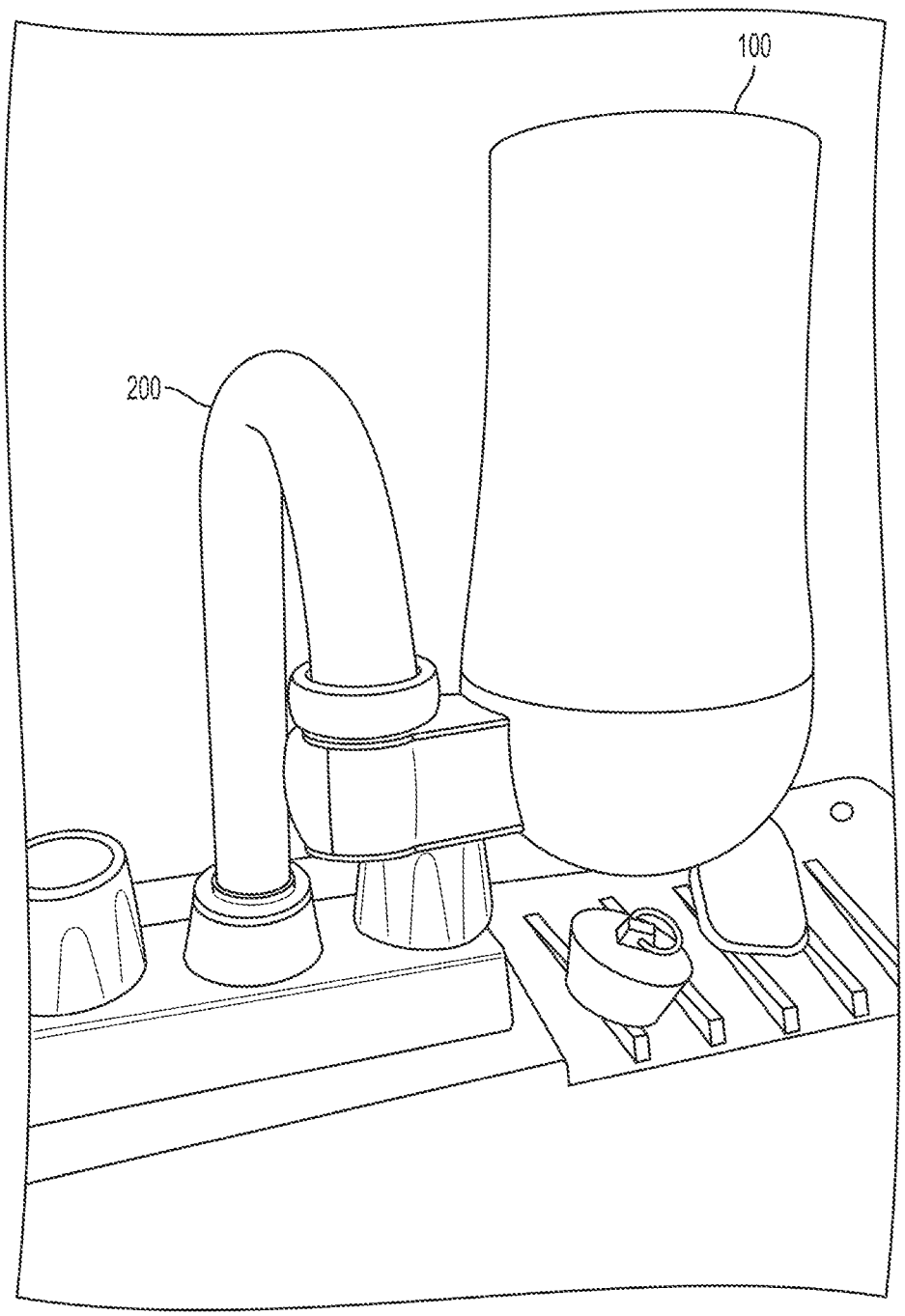
FIG. 1C illustrates a perspective view of a water filtration apparatus in accordance with one or more embodiments.
Figure 13:
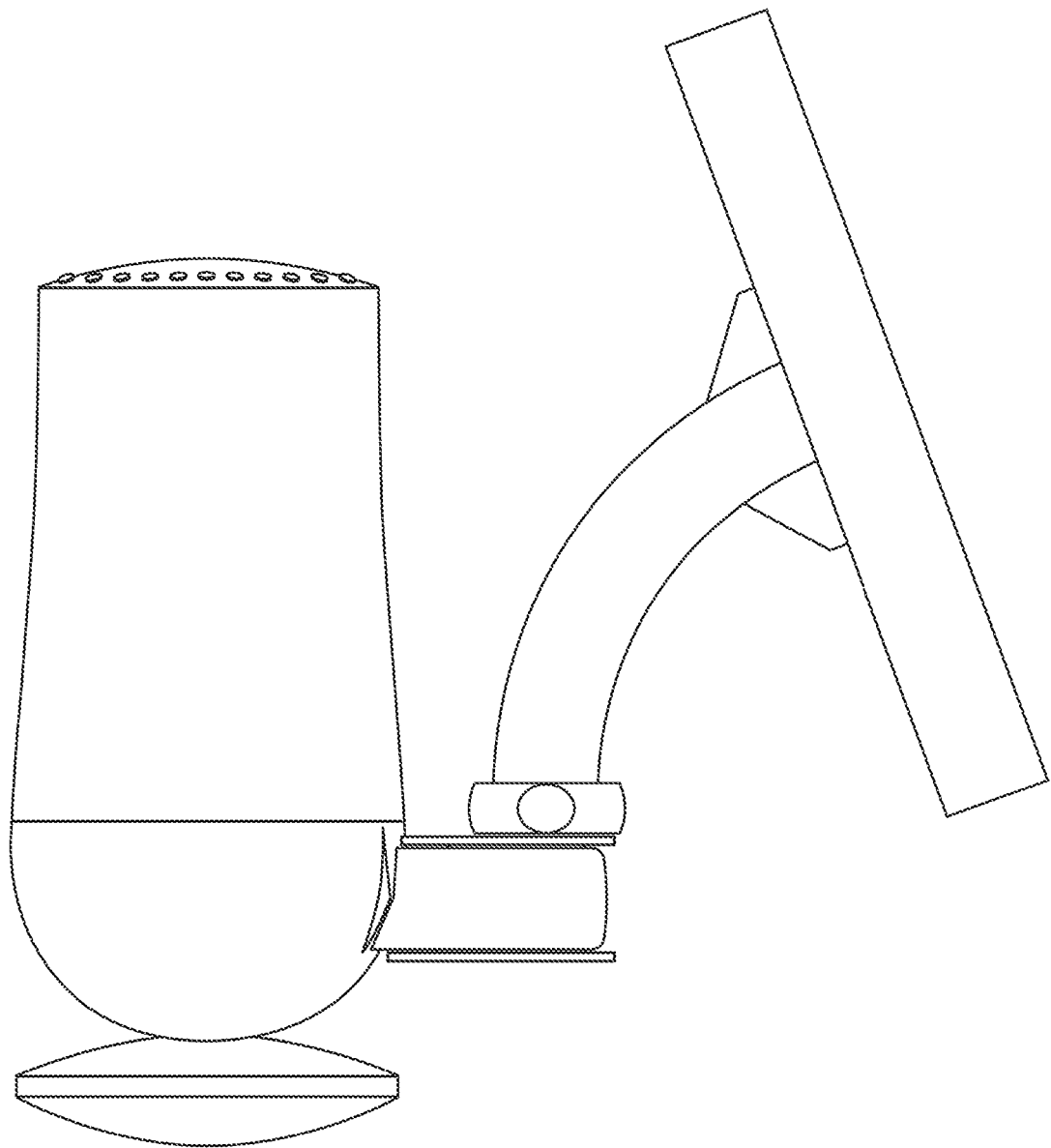
FIG. 13 illustrates a water filtration apparatus with shower attachment.
Figure 14:
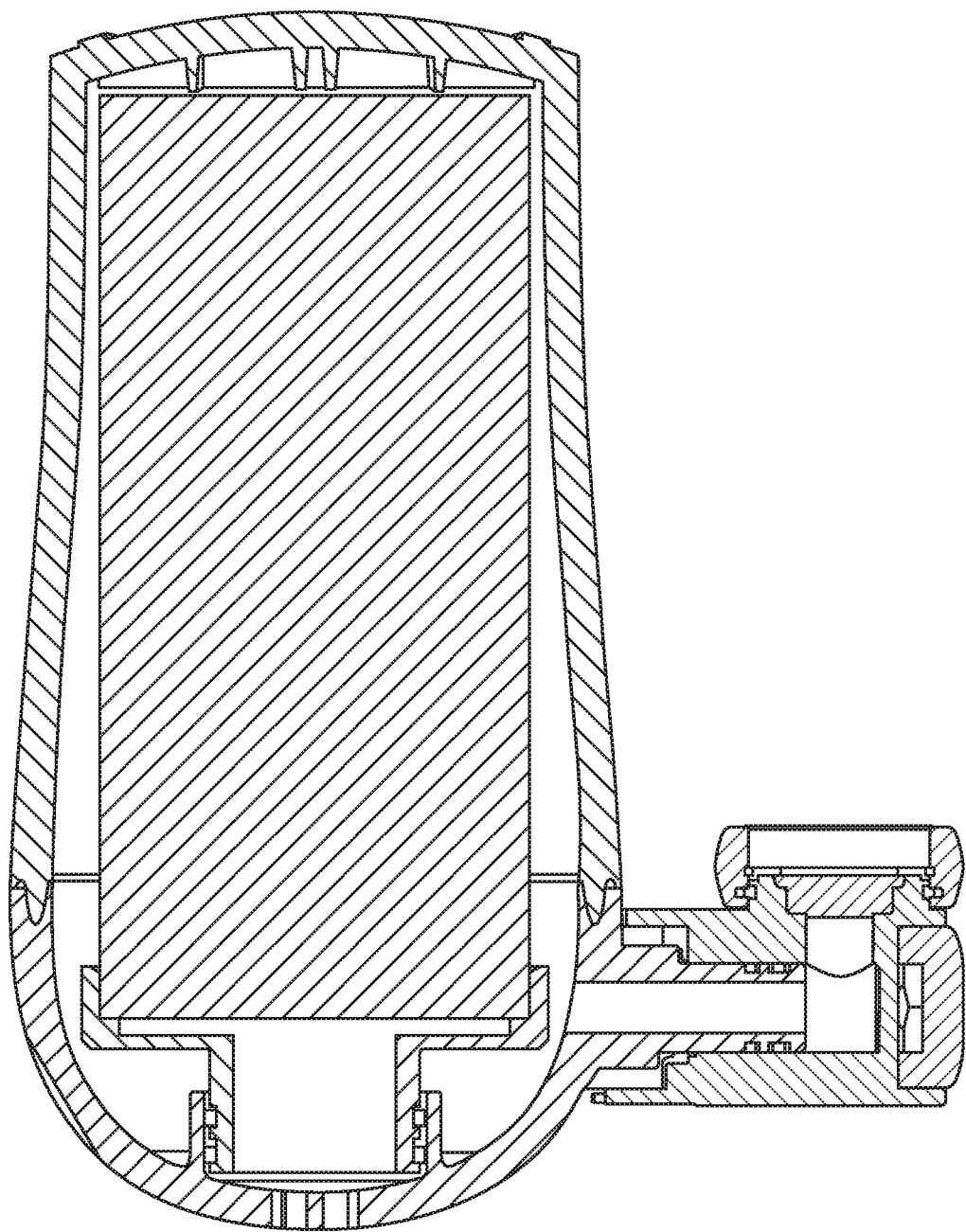
FIG. 14 illustrates a water filtration apparatus with a single filter member.

A faucet filtration apparatus 100 is shown in FIG. 1A-1C. FIG. 1A illustrates an assembled apparatus, and FIG. 1B illustrates an unassembled apparatus 100. FIG. 1C illustrates the apparatus coupled with a faucet 200, where faucet 200 can be a sink faucet or a shower faucet or other point of use water dispensing fixture. The filtration apparatus is situated relative to the faucet such that the filtration apparatus is above the faucet spout where the apparatus does not interfere with the use of the sink. In one or more embodiments, the filtration apparatus 100 is located off to the side of the faucet 200. In the case of a shower installation the filter could be located above the outlet tube as shown in FIG. 13.

Figure 2:
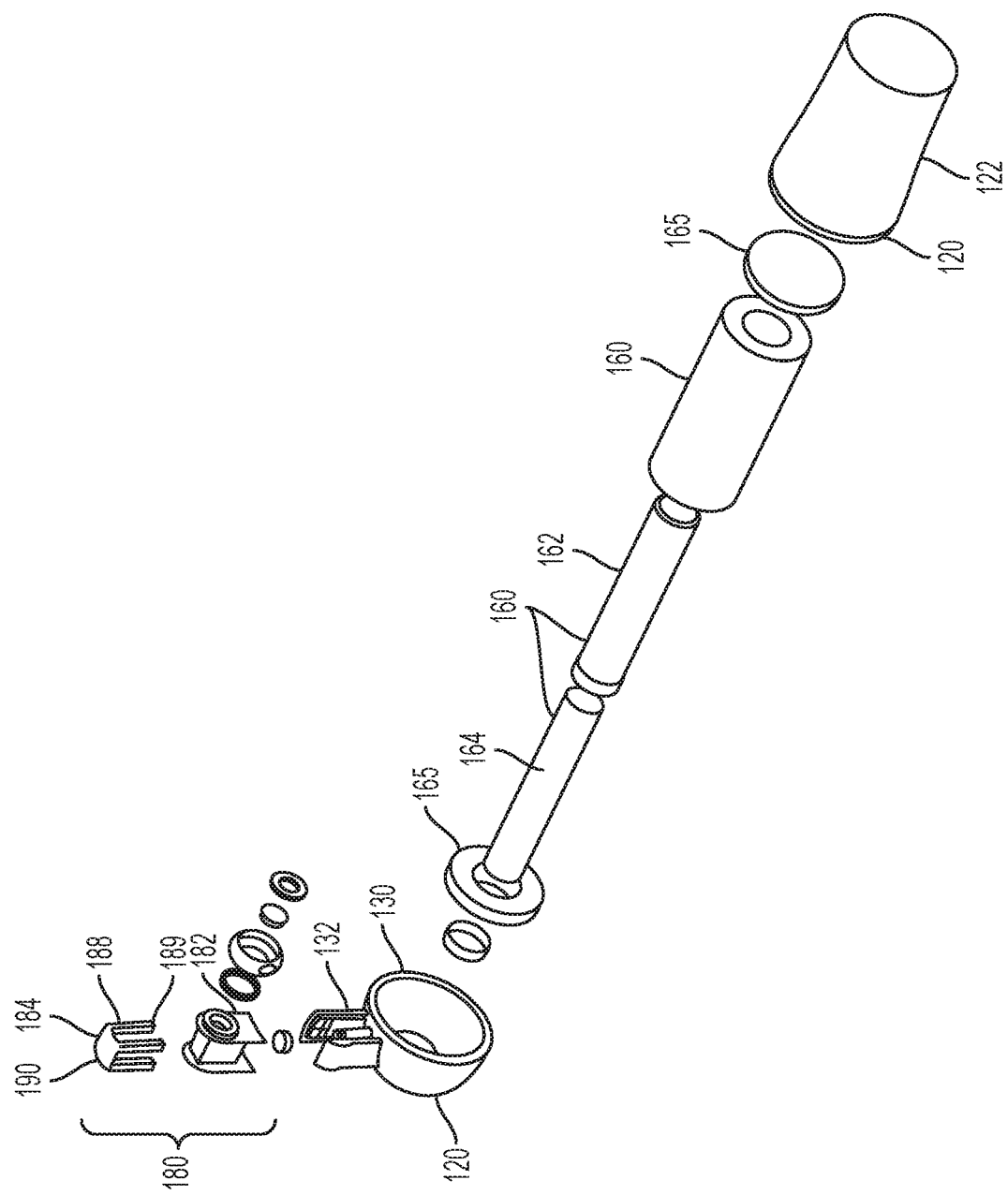
FIG. 2 illustrates an exploded perspective view of a water filtration apparatus in accordance with one or more embodiments.
Figure 3:
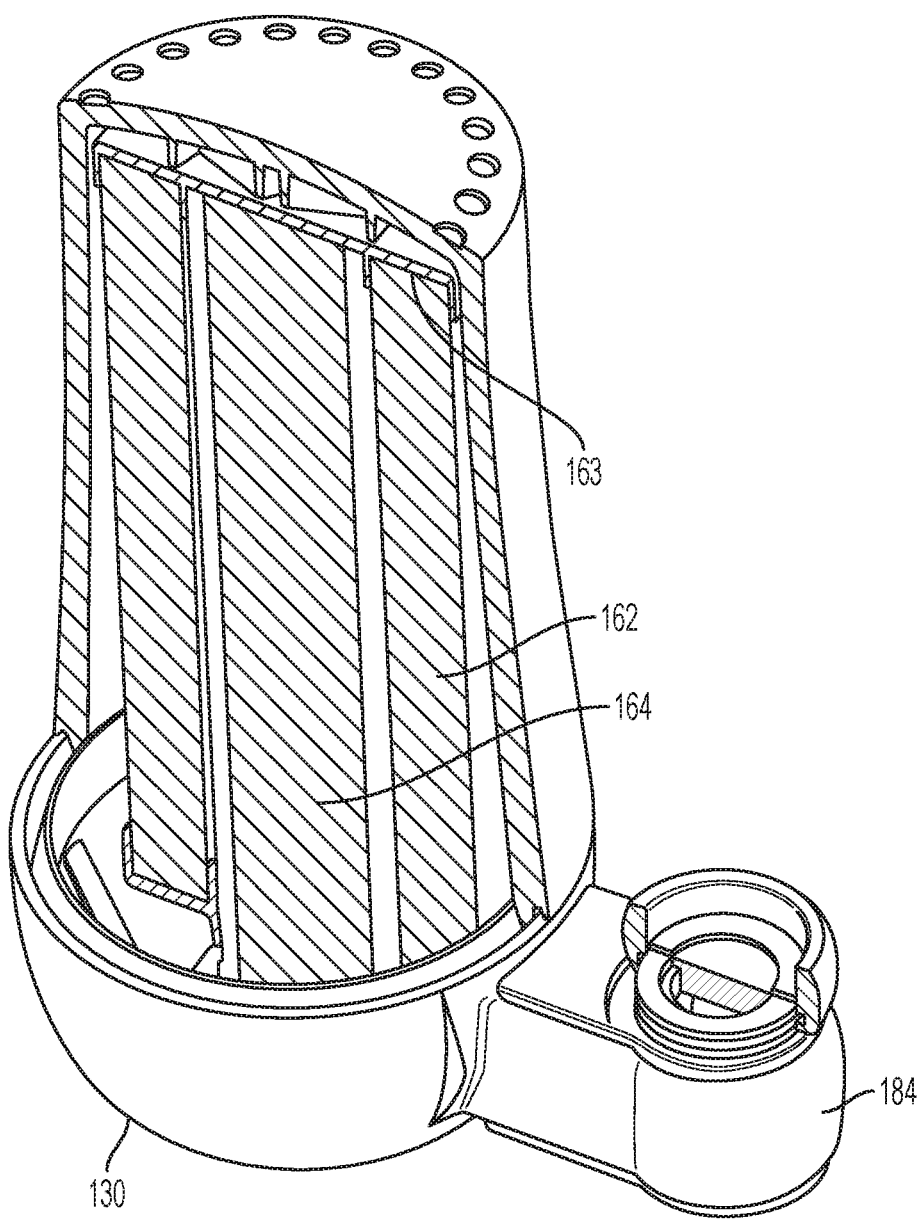
FIG. 3 illustrates a partial cross-sectional view of a water filtration apparatus in accordance with one or more embodiments.

The faucet filtration system 100 is shown in greater detail in FIGS. 2-12. As seen in FIG. 2, the faucet filtration system 100 includes one or more housings 120, one or more filter assemblies 160, and a valve assembly 180. The one or more housings 120 include an upper housing 122 and a lower housing 130, and the upper housing 122 and the lower housing 130 are coupled together at an interface 128. The housings can be molded from plastic material, and coupled together via bonding or welding, or mechanical fasteners. The upper housing 122 and the lower housing 130 receive the filtration assembly 160 therein.

Referring to FIG. 10, the upper housing 122 is defined in part by an exterior 146 and an interior portion 148. The interior portion 148 of the upper housing 122 receives the filtration assembly 160 therein. At a top end of the exterior portion 146 of the upper housing 122 is a plurality of projections 124, in one or more embodiments. The projections 124 can be used to assist with welding the upper housing 122 with the lower housing 130. The upper housing 122 further includes one or more ribs which can be used to strengthen the housing.

Figure 6:
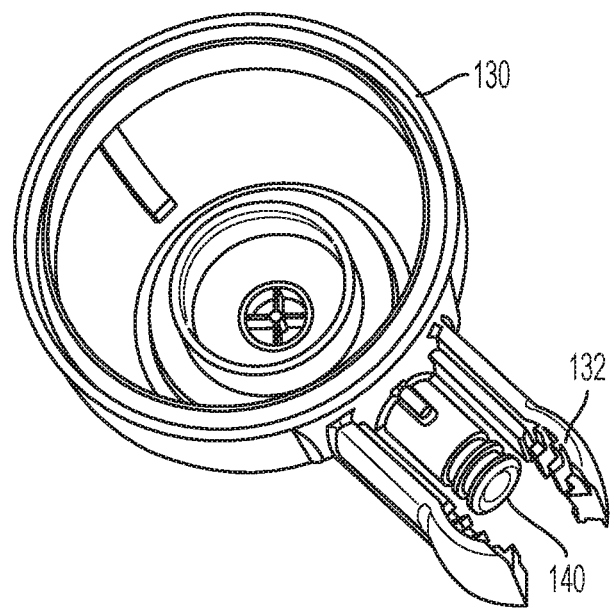
FIG. 6 illustrates a perspective view of a lower housing in accordance with one or more embodiments.
Figure 7:
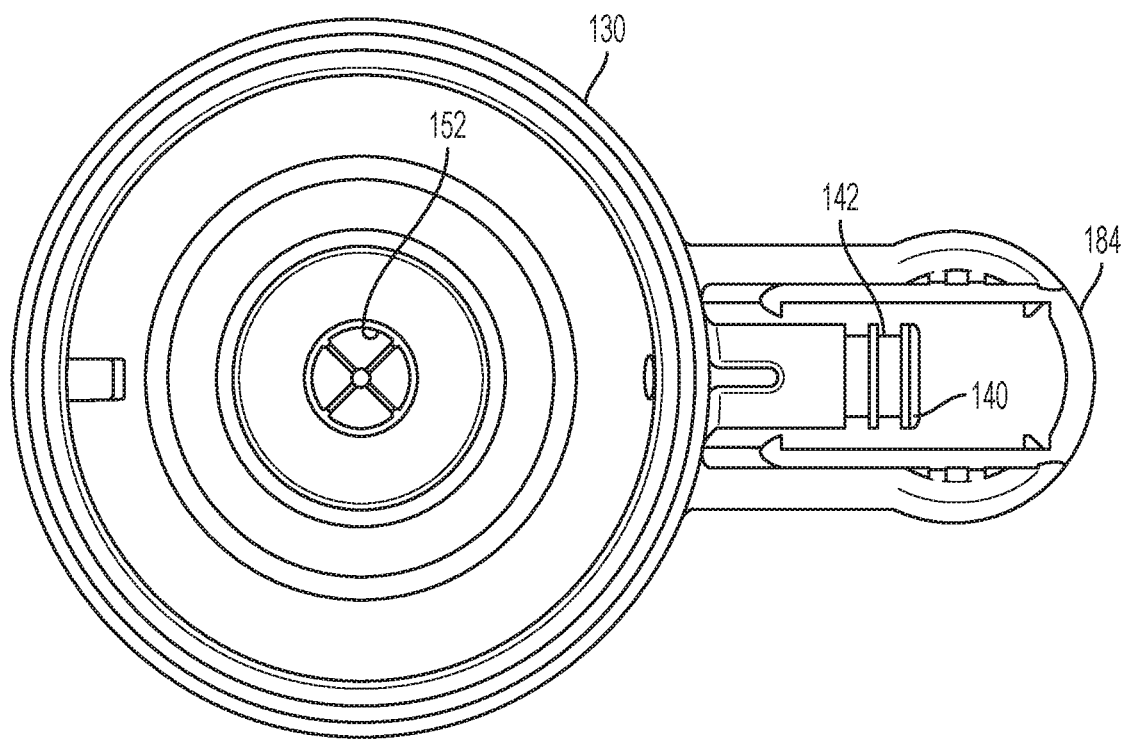
FIG. 7 illustrates a top view of a lower housing and release lever in accordance with one or more embodiments.

The lower housing 130 is shown in greater detail in FIGS. 6-8. In one or more embodiments, the lower housing 130 has a generally hemispherical shape, which supports a bottom portion of the one or more filter assemblies 160. The lower housing 130 is defined in part by an exterior 146 and an interior portion 148. The interior portion 148 of the lower housing 130 receives the filtration assembly 160 therein.

The lower housing 130 further includes a valve stem 140. The valve stem is fluidly connected between the valve assembly 180 and an interior portion of the housing, where the filter assembly is located. The valve stem 140 provides a conduit between the valve assembly, which is coupled with the faucet, and the filter assembly 160, and allows for the un-filtered water to be introduced into the water filtration apparatus.

In one or more embodiments, the valve stem 140 extends outward from an exterior portion 146 of the lower housing 130, and in one or more embodiments, is disposed between the latch arms 132. In one or more embodiments, the valve stem 140 extends out from a side of the lower housing. In one or more embodiments, the valve stem 140 has a longitudinal axis which is substantially (+/−15 degrees) perpendicular to a housing longitudinal axis. In one or more embodiments, the valve stem 140 further includes one or more features, such as, but not limited to a recess 142 which allow for seals to be installed therein.

In one or more embodiments, the lower housing 130 includes one or more latch arms 132. The latch arms 132 allow for the housing and filter assembly to be securely attached to the valve assembly 180. The latch arms 132 also work with the valve assembly 180 so that the valve assembly can be released from the housing and filter, allowing for the installation and removal of the water filtration apparatus from a faucet. In one or more embodiments, the latch arms 132 allow for the valve assembly 180 to be coupled with the valve stem 140, without putting excessive pressure on the valve stem, which might otherwise result in leakage.

In one or more embodiments, the lower housing 130 includes two latch arms on opposite sides of the valve stem 140, where the latch arms 132 extend outward from an exterior portion 146 of the lower housing 130. In one or more embodiments, the one or more latch arms 132 includes a straight section 131 and a curved section 133. In one or more embodiments, the curved section 133 includes one or more projections 138 extending inwardly toward the valve stem 140. In one or more embodiments, the one or more latch arms 132 include a ramp 134 and a latch 136. The ramp 134, in one or more embodiments, is an angled surface that guides the valve assembly 180 as it is installed. The curved section 133 further includes a latch 136 that engages the valve assembly 180 to retain the valve assembly therein. In one or more embodiments, the two latch arms are longer than the valve stem 140. In one or more embodiments, a rib 144 is disposed between the two latch arms and connects the two latch arms. The rib 144 creates tension and additional rigidity for the latch arms, and holds the latch arms 132 together. This is helpful, for example, if higher pressure forces higher pressure on the cartridge, and the rib 144 holds the arms in together.

The lower housing 130 further includes an interior portion 148, for example of the hemispherical shape that allows for the filter to be received therein. Within the interior portion is a cylindrically shaped wall 150. The wall 150 receives the internal filter 164 therein. The wall 150 also surrounds an opening 152 that is disposed in the bottom portion of the lower housing 130. The opening 152 allows for filtered water to exit the faucet filtration system 100 for a user to use or consume.

Figure 8B:
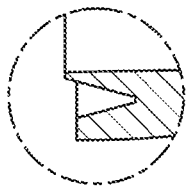
FIG. 8B illustrates an enlarged cross-sectional view of a lower housing in accordance with one or more embodiments.
Figure 8C:
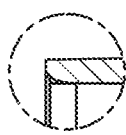
FIG. 8C illustrates an enlarged cross-sectional view of a lower housing in accordance with one or more embodiments.
Figure 8D:
FIG. 8D illustrates an enlarged cross-sectional view of a lower housing in accordance with one or more embodiments.
Figure 8E:
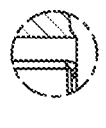
FIG. 8E illustrates an enlarged cross-sectional view of a lower housing in accordance with one or more embodiments.
Figure 8F:
FIG. 8F illustrates an enlarged cross-sectional view of a lower housing in accordance with one or more embodiments.
Figure 8A:
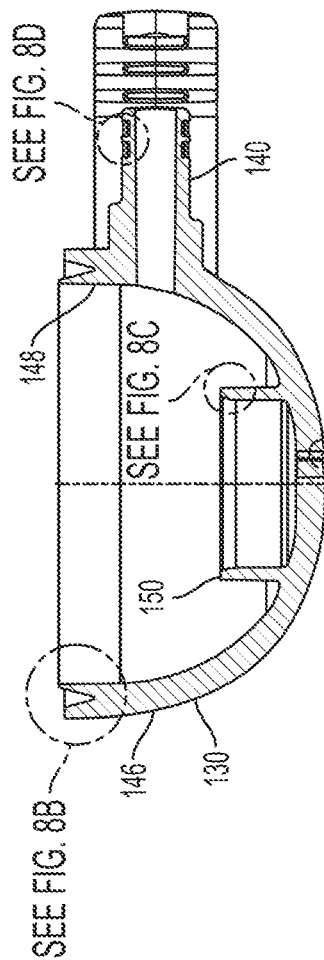
FIG. 8A illustrates a cross-sectional view of a lower housing in accordance with one or more embodiments.
Figure 8H:
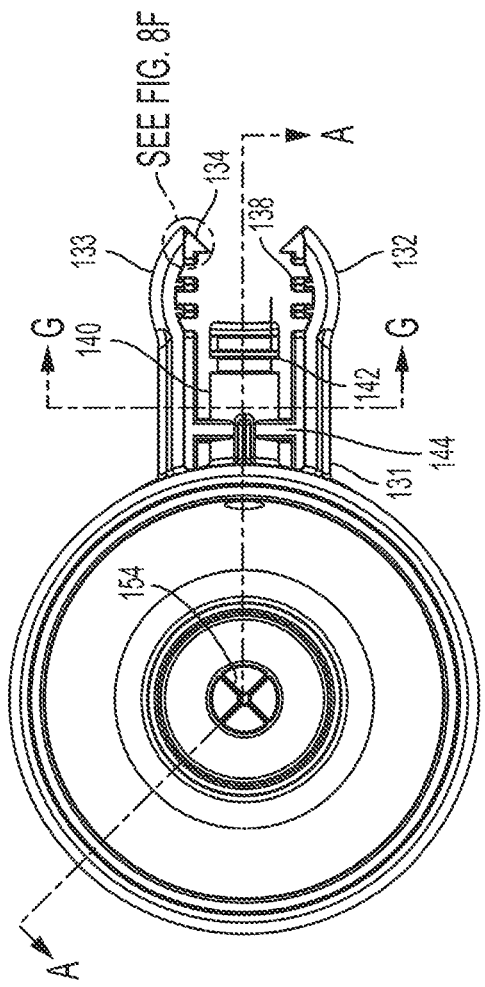
FIG. 8H illustrates a top view of a lower housing in accordance with one or more embodiments.
Figure 8G:
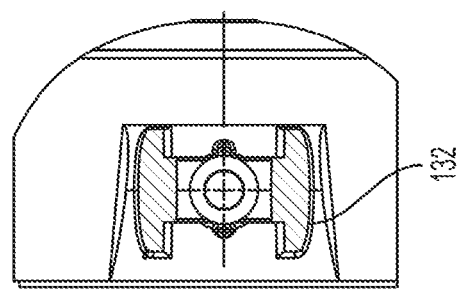
FIG. 8G illustrates a cross-sectional view of a lower housing in accordance with one or more embodiments.
Figure 9:
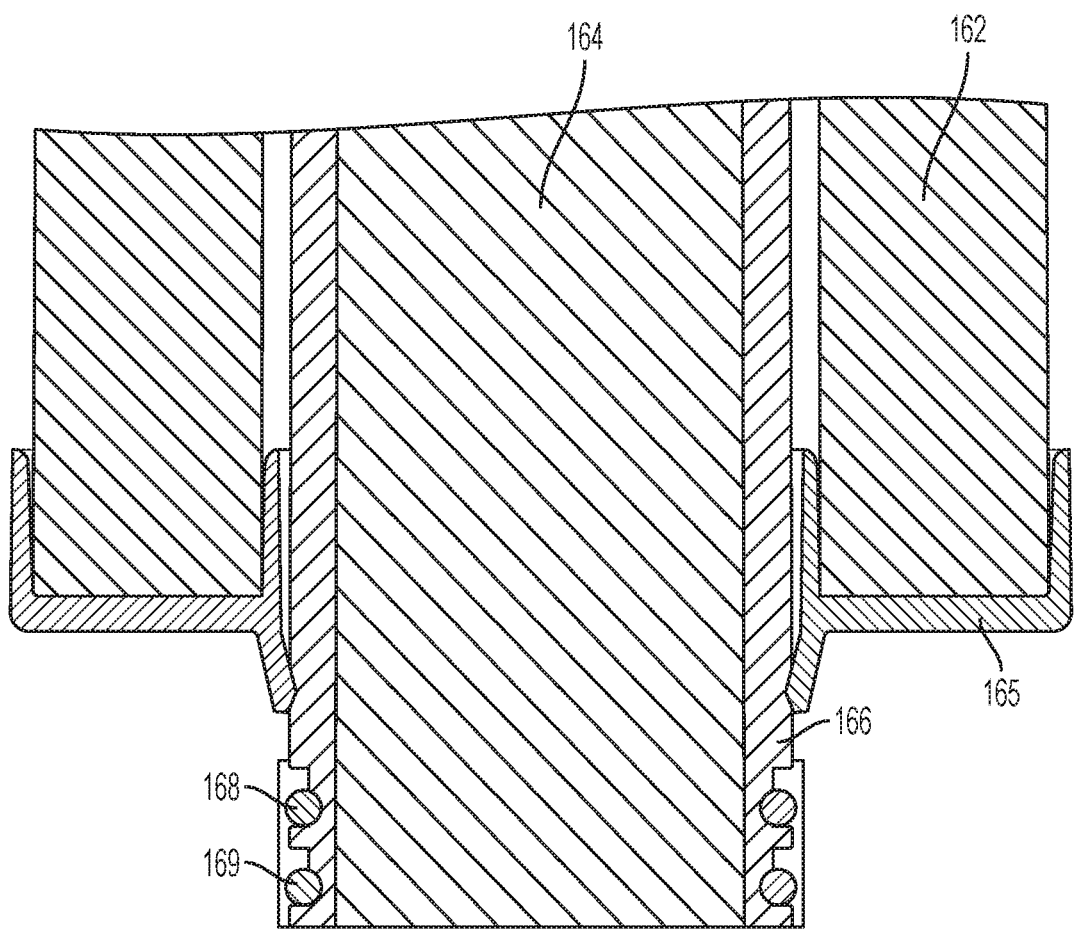
FIG. 9 illustrates a cross-sectional view of a water filtration apparatus in accordance with one or more embodiments.
Figure 10D:
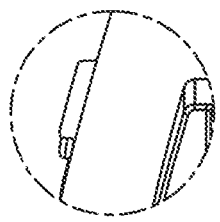
FIG. 10D illustrates a cross-sectional view of a portion of an upper housing in accordance with one or more embodiments.
Figure 10C:
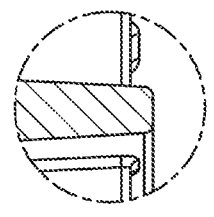
FIG. 10C illustrates an enlarged cross-sectional view of an upper housing in accordance with one or more embodiments.
Figure 10B:
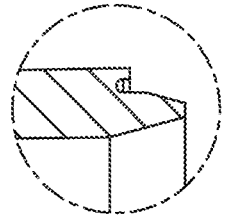
FIG. 10B illustrates an enlarged cross-sectional view of an upper housing in accordance with one or more embodiments.
Figure 10E:
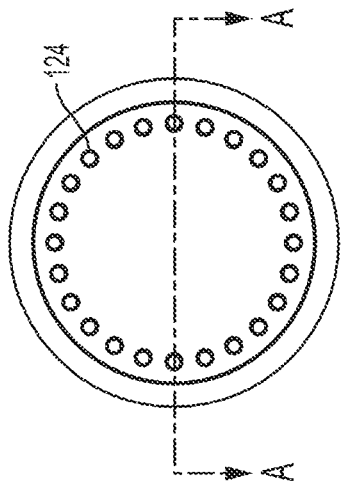
FIG. 10E illustrates a top view of an upper housing in accordance with one or more embodiments.
Figure 10A:
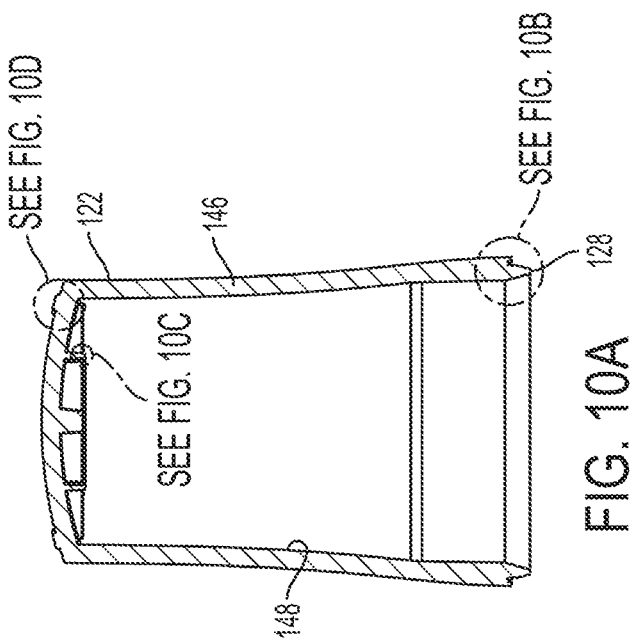
FIG. 10A illustrates a cross-sectional view of an upper housing in accordance with one or more embodiments.
Figure 12B:
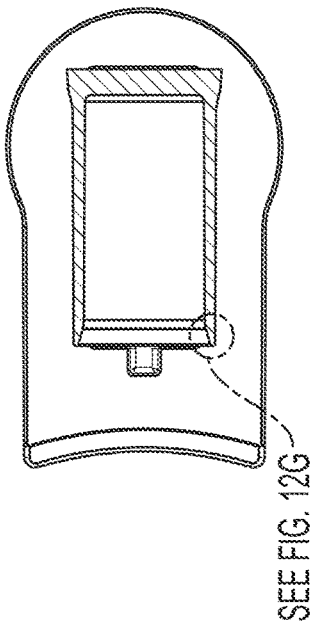
FIG. 12A-G illustrate a valve body in accordance with one or more embodiments.
Figure 12E:
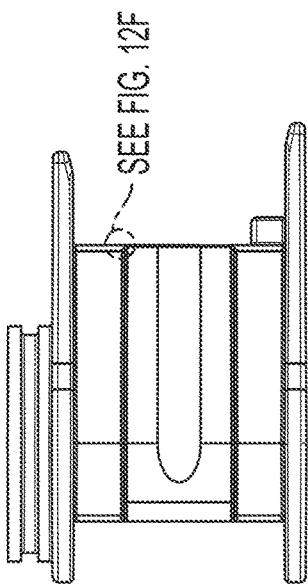
Figure 12A:
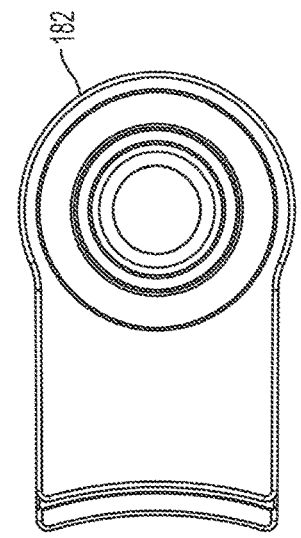
Figure 12D:
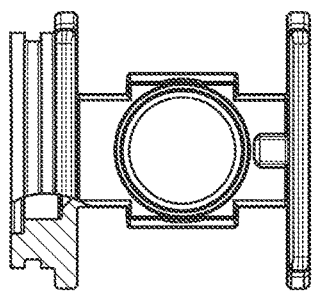
Figure 12F:
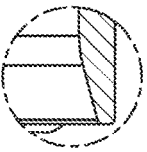
Figure 12C:
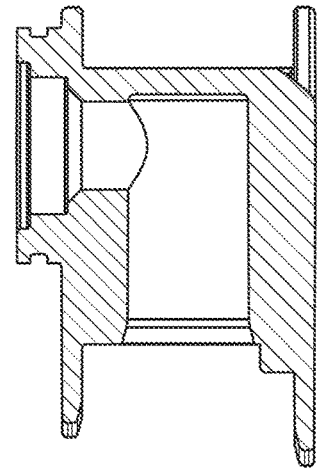
Figure 12G:
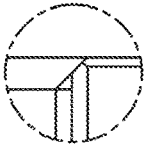

In one or more embodiments, blocking structure 154 is disposed within the opening 152. For example, within the opening 152 is a cross-structure 154 providing additional stability to the lower housing 130. In one or more embodiments, the cross-structure extends from a first side of the opening 152 to a second side of the opening 152. In one or more embodiments, the cross-structure includes multiple cross-structures forming an "X" shape, as shown in FIG. 8H. The blocking structure 154 also assists in preventing contamination by blocking a user with non-clean hands from inserting fingers into the housing. Additionally, the cross structure acts a flow straightener for the outlet water.

The mold is designed so that a different insert can be exchanged to create multiple types of water exits such as a shower head (rose) so the unit can be adapted as a shower head. (See FIG. 13)

FIGS. 2-4, 9, and 11 illustrate the filtration assembly 160 in greater detail. The filtration assembly 160, in one or more embodiments, includes a pre-filter 162 and an internal filter 164. In one or more embodiments, the pre-filter 162 surrounds the internal filter. In one or more embodiments, the pre-filter comprises a 2.0 micron cartridge, for example a pleated cartridge, and the internal filter comprises a 0.15 micron cartridge. In one or more embodiments, the pre-filter comprises a 0.5-5.0—micron cartridge and the internal filter comprises a 0.05-0.25 micron cartridge. In one or more embodiments, the prefilter is 1.5-2.5 micron and the internal filter is 0.1-0.2 micron cartridge. In one or more embodiments, both the pre-filter and the internal filter comprise 0.15 micron cartridge. In one or more embodiments, the filter includes activated carbon and/or hollow fiber membrane. In one or more embodiments, the filtration assembly 160 includes a single filter, and a lower end cap, as shown in FIGS. 14, 15A-15C.

In one or more embodiments, the pre-filter 162 includes an upper cap 163 and a lower cap 165, which house the filtration material therein. In one or more embodiments, the internal filter 164 includes an internal filter casing 166. In one or more embodiments, the internal filter casing 166 includes one, two, or more seals mounted therein or thereon. In one or more embodiments, the internal filter casing 166 includes seal mounting features, such as recesses 167. The seals are disposed between the internal filter casing 166 and the lower housing 130.

In one or more embodiments, the one, two or more seals are self-energizing seals. The seals include a first seal 168 and a second seal 169 that provide effective sealing between the dirty water within the filter assembly and the clean water that is exiting the housing.

In one or more embodiments a flange portion of the lower end cap of the prefilter acts as a self-energizing seal to the inner filter.

Figure 5:
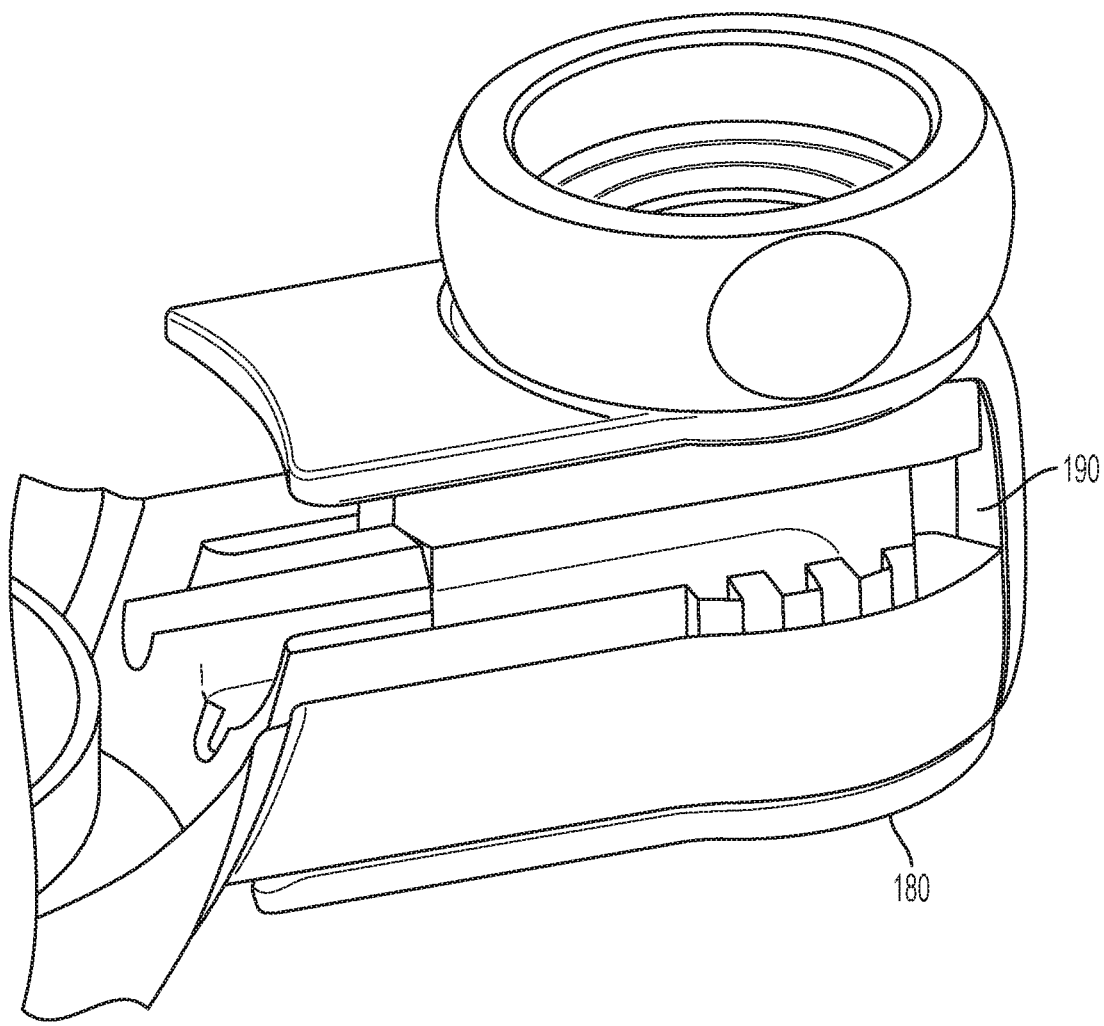
FIG. 5 illustrates an enlarged perspective view of a portion of a water filtration apparatus in accordance with one or more embodiments.

FIGS. 2, 4, and 5 illustrate the valve assembly 180 in greater detail. The valve assembly 180 is used to mechanically couple and uncouple the filtration apparatus 120 to and from a faucet, and to provide the conduit for the unfiltered water to enter the filtration apparatus from the faucet. The valve assembly 180 includes a valve body 182 (FIG. 12) releasably coupled with the valve stem and latch arms 132. The valve body has a faucet interconnect 186 which serves as a faucet interface component. The valve body is configured to fluidly couple with a faucet via the faucet interface component.

The valve assembly 180 further includes a valve body release 184 which is used to release the connection of the valve assembly from the latch arms 132 of the housing 120. The valve body release 184 is slidable relative to the valve body and the one or more latch arms 132. The valve body release 184 includes arms 188, as shown in FIGS. 2 and 7. The release 184 includes a catch 189, which keeps the release 184 installed. During installation of the filtration apparatus the user pushes the filter assembly 120 onto the valve body assembly 180. The latch arms 132 slide freely until the end of travel where they are lifted by a ramp surface on the valve body 182 and fall over the latch surface on the valve body 182. To release the filter assembly, the user pushes the release slider 184 toward the valve body and filter thereby lifting the release arms by ramp surface 190 and releasing the filter assembly 120 from the valve body 180.

As the release 184 is pushed toward the housing 120, the ramp surfaces 190 of the release 184 expand the latch arms of the housing 120, allowing the valve assembly 180 to be disassembled from the housing 120, to a second uncoupled position. The user installs the valve assembly 180 on the faucet 200, for example using a threaded interconnect component. After the valve assembly 180 is installed, the housing can be re-coupled with the valve assembly 180 to a first coupled position.

It is to be understood that the above description is intended to be illustrative, and not restrictive. Many other embodiments will be apparent to those of skill in the art upon reading and understanding the above description. It should be noted that embodiments discussed in different portions of the description or referred to in different drawings can be combined to form additional embodiments of the present application. The scope should, therefore, be determined with reference to the appended claims, along with the full scope of equivalents to which such claims are entitled.

The invention claimed is:

1. A faucet filtration apparatus comprising:
a housing including an upper housing and a lower housing, the upper housing and the lower housing are molded from plastic material and coupled together by welding, the upper housing includes an upper housing interior portion and an upper housing exterior portion, the upper housing interior portion to receive a filter assembly, the upper housing includes an upper housing rib to strengthen the housing, a top end of the upper exterior portion includes a plurality of projections to assist with welding the upper housing with the lower housing, the lower housing has a hemispherical shape, the lower housing includes a lower housing exterior portion and a lower housing interior portion, the lower housing interior portion to receive the filter assembly, the lower housing includes a valve stem fluidly connecting a valve assembly with the lower housing interior portion, the valve stem extends outward from the lower housing exterior portion, the valve stem has a longitudinal axis which is substantially perpendicular to a housing longitudinal axis, the valve stem includes a valve stem recess which allows a valve stem seal to be installed in the valve stem recess,
the lower housing includes two latch arms, the two latch arms disposed on either side of the valve stem, the two latch arms enable the housing and the filter assembly to be securely attached to the valve assembly, the two latch arms work with the valve assembly so that the valve assembly can be released from the housing, the two latch arms enable the valve assembly to be coupled with the valve stem,
the lower housing interior portion includes a cylindrically shaped wall, the cylindrically shaped wall surrounds an opening that is disposed in the lower housing, the opening allows for filtered water to exit the faucet filtration apparatus,
a blocking structure is disposed within the opening to provide additional stability to the lower housing, the blocking structure extends from a first side of the opening to a second side of the opening, the blocking structure forms an "X" shape, the blocking structure acts as a flow straightener,
the two latch arms extend outward from the lower housing exterior portion, each of the two latch arms include a straight section and a curved section, each of the two latch arms include a ramp and a latch, the ramp is an angled surface that guides the valve assembly as the valve assembly is installed, the curved section further includes the latch that engages the valve assembly to retain the valve assembly, the two latch arms are longer than the valve stem, a latch rib is disposed between the two latch arms and connects the two latch arms, the latch rib creates tension and additional rigidity for the two latch arms and holds the two latch arms together,
the filter assembly includes a pre-filter and an internal filter, the pre-filter surrounds the internal filter, the pre-filter includes a 2.0 micron cartridge, the 2.0 micron cartridge is a pleated cartridge, and the internal filter comprises a 0.15 micron cartridge, the pre-filter includes an upper cap and a lower cap, the lower cap includes a flange, the flange acts as a self-energizing seal to the internal filter, the internal filter includes an internal filter casing, the internal filter casing includes a first seal mounted in a first seal recess located on the internal filter casing and a second seal mounted in a second seal recess located on the internal filter casing, the first seal and the second seal are disposed between the internal filter casing and the lower housing, the first seal and the second seal are self-energizing seals and the first seal and the second seal provide sealing between unfiltered water within the filter assembly and the filtered water exiting the housing, the valve assembly mechanically couples and uncouples the filter assembly to and from a faucet and provides a conduit for the unfiltered water to enter the filter assembly from the faucet, the valve assembly includes a valve body releasably coupled with the valve stem and the two latch arms, the valve body has a faucet interconnect which serves as a faucet interface component, the valve body is configured to fluidly couple with the faucet via the faucet interconnect, the valve assembly includes a valve body release which is used to release the valve assembly from the two latch arms of the housing, the valve body release is slidable relative to the valve body and the two latch arms, the valve body release includes a catch, which keeps the valve body release installed.

* * * * *